Patented Oct. 5, 1954

2,691,003

UNITED STATES PATENT OFFICE 2,691,003

BUILDING MATERIAL COMPRISING A HYDRAULIC BINDER, GUM ARABIC, AND A RESIN

Gabriel Stanislas Bouvier, Gentilly, and Roger Pierre Clair, Paris, France

No Drawing. Application August 5, 1950, Serial No. 177,979

Claims priority, application France July 31, 1947

4 Claims. (Cl. 260—17.3)

The present invention relates to compositions suitable for building purposes, for external and internal decoration, and for the manufacture of various commodities such as furniture.

The present application is a continuation-in-part of our co-pending application filed June 23, 1948 having the Serial No. 34,824 now abandoned.

In our co-pending application, Serial No. 18,303 filed March 31, 1948 and now abandoned which corresponds to our French patent No. 533,810 filed April 29, 1947, we have described compositions and methods of preparing such compositions which are particularly suited for building purposes. These building materials are finely ground mixtures of calcium sulfate, calcined limestone, pumice or basalt moistened with a solution containing a gummy material and oxidizing agents. The moistened mass is subsequently rolled out and molded by tamping or by application of pressure.

We have found that by forming the phenol-formaldehyde resin on a mineral foundation, a far superior building material is obtained. The addition of a coloring material during such resinification produces a homogeneously tinted building material particularly suitable for decorative purposes.

Accordingly, an object of the instant invention is the resinification of phenol and formaldehyde upon a mineral foundation.

Another object is the addition of coloring matter during said resinification to obtain a uniformly tinted building material.

A further object of the present invention is the manufacture of a superior building material.

Further objects and advantages of the present invention will be apparent from the following description.

It has now been discovered that a building material of superior qualities such as hardness and outstanding brilliance can be obtained by forming the phenol-formaldehyde resin in a colloidal solution containing a gum and a hydraulic binder and a coloring material, and permitting said solution to set at room temperature.

By hydraulic binder is meant any inorganic binding material, such as calcium sulfate, plaster of Paris, cement, and quick lime, which sets under the action of water. The hydraulic binder is preferably in a finely divided condition. Inert materials may be added to the hydraulic binders such as powdered pumice stone of Auvergne or of basalt. These inert materials cause the color of the resultant product to become more vivid.

Any gum which forms an aqueous colloidal solution may be used. However, gum arabic is preferred because it forms an aqueous colloidal solution spontaneously when added to water, obviating the use of special measures to prepare a colloidal solution. The preferred concentration of gum arabic is 20–30 gms. per liter of water. To this colloidal gum solution is added formaldehyde or other aldehydes capable of reacting with a phenol or an aromatic alcohol to form a resin. The preferred amounts are 7% formaldehyde and 30% of a phenol or aromatic alcohol. Rosaniline is a suitable alcohol since it not only acts as a resin-forming alcohol but also functions as a coloring material, said compound being a red dye. Any alcoholic aromatic amine dyestuff may be used. The gum and the resin-forming ingredients, in the form of a colloidal aqueous solution, are admixed with a hydraulic binder and thoroughly stirred at room temperature. The hydraulic binder absorbs the excess water in the solution, thereby forming a gum-containing resin within the mass of hydraulic binder. The resultant mass is a homogeneous dispersion of the resin and gum upon and within the hydraulic binder. Where rosaniline is used in lieu of phenol, a colored gum-containing resin precipitates within the mass of the hydraulic binder, thereby producing a uniformly tinted building material.

Coloring materials such as aromatic amine coloring compounds with an alcoholic radical may be substituted for the phenol reactant of the resinification process, such as rosaniline. Mineral pigments such as Prussian Blue, and chrome yellow may be substituted for the aforementioned aromatic alcohol dyes. Mineral coloring matters which are convertible into salts such as iron sesquioxide, eosin, aniline black, etc., may likewise be utilized to color the resultant composition.

Electrolytes such as sodium chloride may be added to the colloidal gum solution to effect a separation of the ions, thereby altering the color of the outer surface of the building material. This polar adsorption functions to enrich the desired coloration. An example of the effect which sodium chloride has on the color of the final product is clearly shown in the case of the rosaniline-formaldehyde, gum and hydraulic binder composition which ordinarily is pink, but upon the addition of 0.25% sodium chloride is changed to a snuff brown color.

The process of obtaining the superior quality building material of the instant invention comprises the steps of first forming a colloidal aqueous solution of the gum, adding to said colloidal solution a phenol or an aromatic alcohol and an aldehyde, and a coloring material. All the aforementioned ingredients are dispersed in the water in a colloidal state. A hydraulic binder is thoroughly stirred and mixed with the aforementioned colloidal solution and allowed to set at room temperature. The hydraulic binder absorbs the water at the same time that the resin precipitates carrying along therewith the gum and coloring material, forming thereby a homogeneous mass having a very deep brilliant surface coloration. The resultant product is particularly suitable as a building material and in the production of structural elements.

An absorbent material may or may not be added to the colloidal aqueous solution, enabling the assimilation of the structural elements with lacquers or varnish.

The following examples are additionally illustrative of the present invention and are not to be construed as limiting the scope thereof.

*Example I*

To a solution of gum arabic containing 30 grams of gum arabic per liter of water, there is introduced 30% by weight of rosaniline which acts both as a coloring material and as a resin-forming alcohol, and also 7% of formaldehyde solution having a concentration of 40%. This mixture is thoroughly stirred and associated with a hydraulic binder such as plaster of Paris, cement or quicklime at room temperature. As disclosed in our above-mentioned co-pending specification, the hydraulic binder absorbs the excess water in the solution with the result that there is a direct formation of a colored gum-containing resin in the mass of the hydraulic binder.

*Example II*

The procedure of Example I is repeated with the substitution of ordinary phenol for the rosaniline, and the addition of pulverulent iron sesquioxide into the colloidal mixture in an amount of 5% of the weight of the solution before stirring and incorporating the mixture with the hydraulic binder. A colored gum-containing resin is obtained similarly.

*Example III*

Following the procedure of either Examples I and II, sodium chloride is added to the colloidal solution in an amount of 0.25% by weight. The addition of this electrolyte has the effect of separating the ions and thereby changing the outer color of the final resulting composition.

*Example IV*

A colloidal solution of gum arabic in a concentration of 30 grams per liter of water is prepared, to which is added 30% phenol and 7% of a formaldehyde solution of 40% concentration. Ordinarily three phenol-formaldehyde isomers are possible: 1. A Bakelite resin A which is stable and pale rose in color. 2. A resin B which is light beige in color. 3. A resin C which is dark beige in color.

Plaster of Paris is incorporated with the colloidal solution as in Example I, resulting in a pink coloration. The prior addition of sodium chloride to the colloidal solution produces a tobacco-brown coloration in lieu of the pink coloration obtained ordinarily.

*Example V*

The addition of the colloidal solution of any of the Examples I to IV to a mixture of plaster of Paris with 5% pulverulent pumice stone of Auvergne or of basalt produces colors in the final gum-containing resin which are the same as indicated above but are much more vivid and homogeneous.

*Example VI*

The procedure of Example II is repeated with the modification that the coloring material is eosin in the proportion of one part of eosin for 150 parts of solution, instead of iron sesquioxide. The colloidal solution containing eosin is admixed with the hydraulic binder, as indicated above, producing a very stable color which is similar to the color of red porphyry. A similar vivid color may be obtained with aniline black.

Although the present invention has been described with reference to particular embodiments and examples, it will be apparent that variations and modifications can be substituted therefor without departing from the principles and true spirit of the invention.

What we desire to be claimed by Letters Patent is:

1. A method of manufacturing a building material which comprises forming a colloidal aqueous gum arabic solution; adding to said gum arabic solution rosaniline and formaldehyde which react together to form a tinted synthetic resin; intimately mixing with said solution an inorganic hydraulic binder adapted to be hardened upon hydration; and allowing the composition to set at room temperature, whereby a tinted homogeneous building material is formed.

2. A method of manufacturing a building material which comprises forming a colloidal aqueous gum arabic solution; adding to said gum arabic solution rosaniline and formaldehyde which react together to form a tinted synthetic resin; intimately mixing with said solution plaster of Paris; and allowing the composition to set at room temperature, whereby a tinted homogeneous building material is formed.

3. A uniformly tinted, homogeneous building material having a base of an inorganic hydraulic binder adapted to be hardened upon hydration intimately associated with a gum arabic-containing rosaniline-formaldehyde resin.

4. A method of manufacturing a homogeneously colored hard building material, comprising the steps of forming a colloidal aqueous solution of formaldehyde, rosaniline adapted to react at room temperature with said formaldehyde to form a tinted resin and with gum arabic; intimately mixing the thus formed colloidal solution with plaster of Paris adapted to be hardened upon hydration and with a finely divided inert rock material; and allowing the thus formed mixture to set at room temperature so as to form a colored hardened building material.

References Cited in the file of this patent

FOREIGN PATENTS

| Number | Country | Date |
|---|---|---|
| 288,228 | Great Britain | Feb. 15, 1929 |
| 562,268 | Great Britain | June 26, 1944 |